W. E. & F. J. BLAIR.
HEATING DEVICE FOR INTERNAL COMBUSTION ENGINES.
APPLICATION FILED OCT. 13, 1913.
1,195,179.
Patented Aug. 22, 1916.
2 SHEETS—SHEET 1.
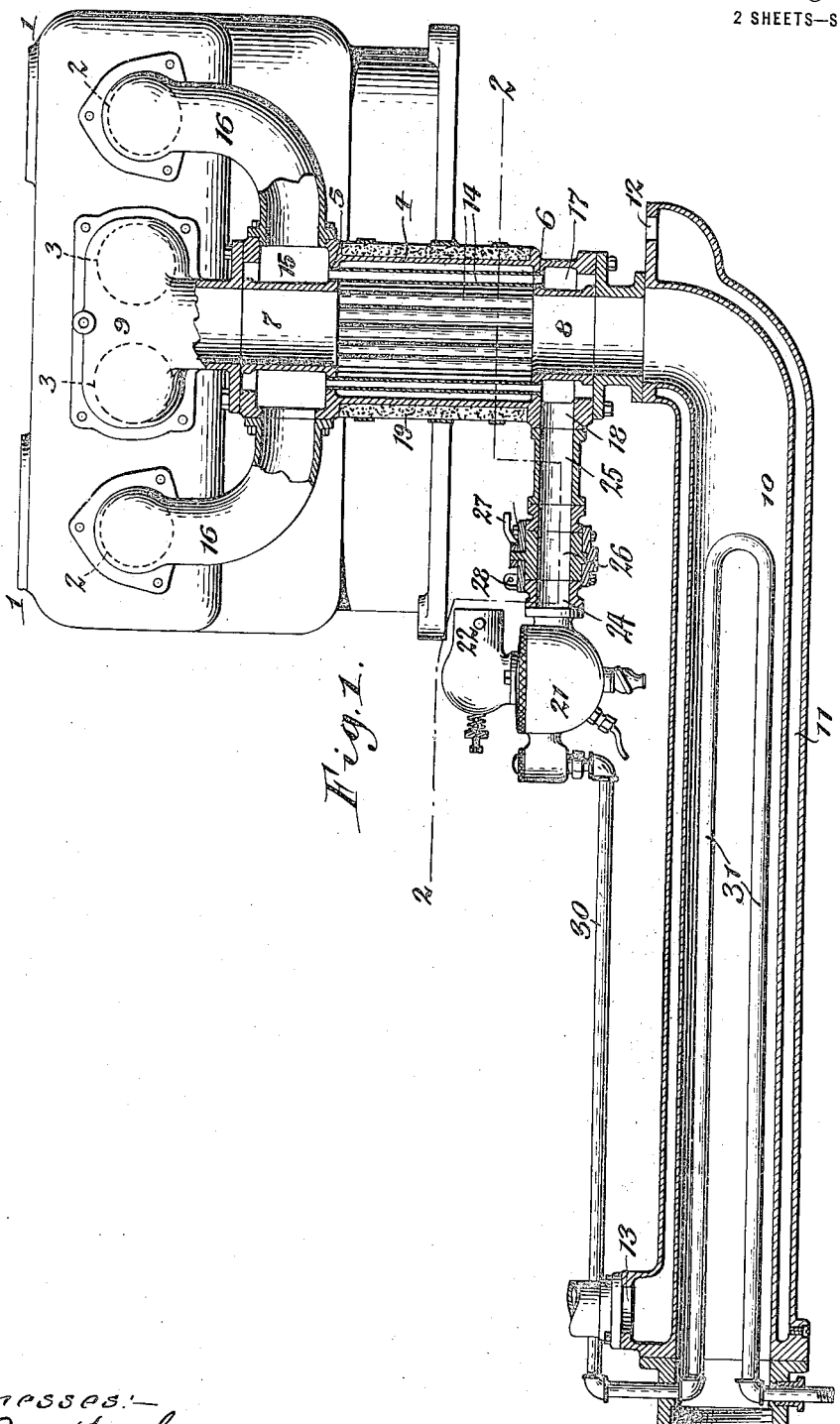

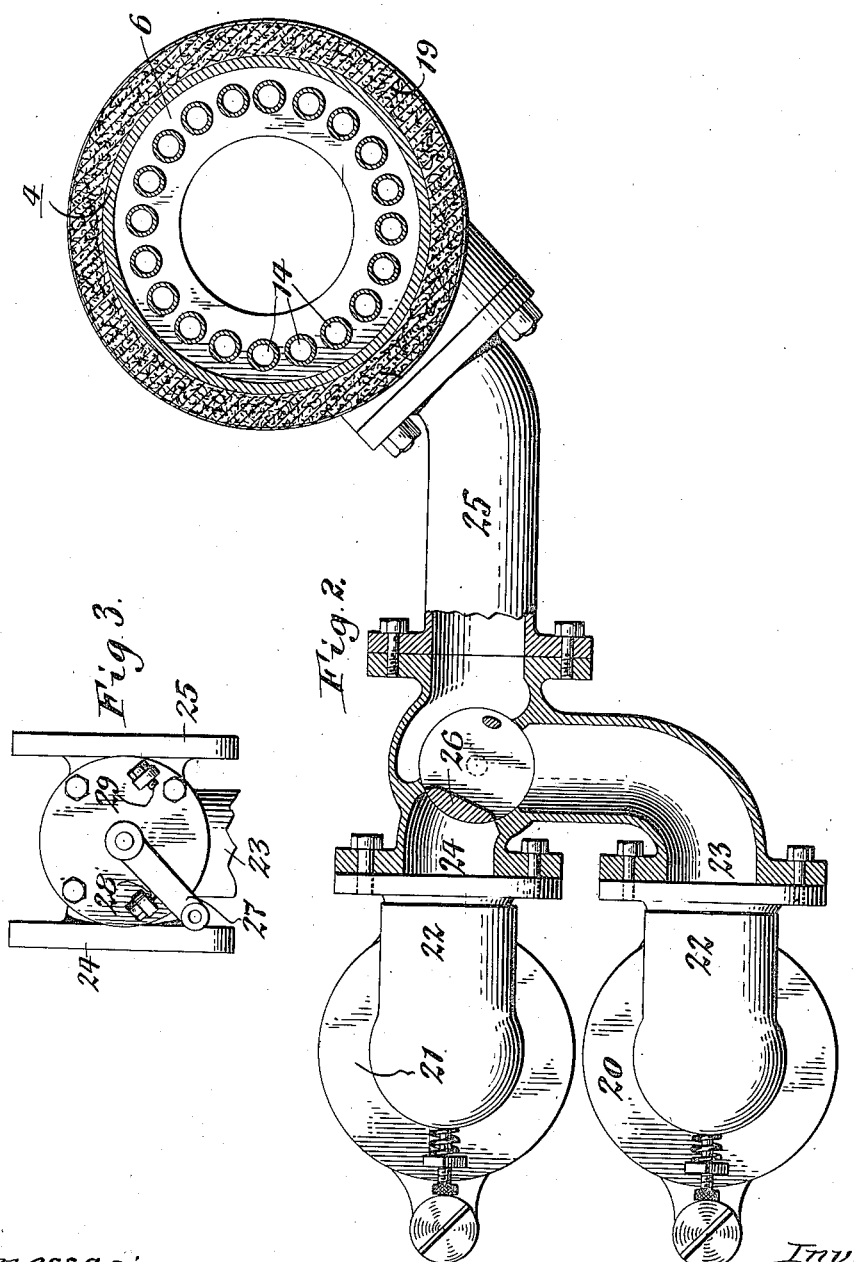

UNITED STATES PATENT OFFICE.

WILLIAM E. BLAIR AND FRANK J. BLAIR, OF BUFFALO, NEW YORK, ASSIGNORS TO BUFFALO GASOLENE MOTOR COMPANY, OF BUFFALO, NEW YORK, A CORPORATION OF NEW YORK.

HEATING DEVICE FOR INTERNAL-COMBUSTION ENGINES.

1,195,179. Specification of Letters Patent. Patented Aug. 22, 1916.

Application filed October 13, 1913. Serial No. 794,783.

*To all whom it may concern:*

Be it known that we, WILLIAM E. BLAIR and FRANK J. BLAIR, citizens of the United States, residing at Buffalo, in the county of Erie and State of New York, have invented new and useful Improvements in Heating Devices for Internal-Combustion Engines, of which the following is a specification.

This invention relates to a heating device for an explosion or internal combustion engine and has the object to provide simple, efficient and economical means whereby the engine may be first started on a liquid fuel which volatilizes at a low temperature and thereafter when the engine has become sufficiently heated the continued operation of the same may be effected by means of a liquid fuel which volatilizes only at a comparatively high temperature. It is thus possible to start an engine and run the same temporarily by using gasolene or a similar fuel which is comparatively expensive and then run the engine throughout the main part of its service with kerosene oil or a similar low priced liquid fuel, thereby effecting a large saving in the cost of running the engine, as well as increasing the safety attending its use.

In the accompanying drawings: Figure 1 is a vertical section of our improvements. Fig. 2 is a horizontal section thereof, on an enlarged scale, taken in line 2—2, Fig. 1. Fig. 3 is a top plan view of the valve whereby the engine may be connected either with one or another kind of fuel supply.

Similar characters of reference indicate corresponding parts throughout the several views.

Our improvements are applicable to explosion or internal combustion engines of various types and for that reason the engine is only represented fragmentarily in the drawings by two power or working cylinders 1, 1 each of which is provided with an inlet 2 for the explosive fuel and an outlet 3 for the spent or waste gases.

The exhaust conduit whereby the spent and waste gases are carried away from the exhaust outlets of the two power cylinders to the atmosphere is so constructed that the heat of these gases is utilized for heating the liquid fuel so as to maintain the fuel, after passing through the carbureter, in a vaporized condition suitable for obtaining the greatest efficiency of the fuel in operating the engine. For the purpose of carrying this object into effect the exhaust conduit is preferably constructed of a plurality of sections one of which preferably forms part of the means for effecting heating of the vaporized fuel and comprises an upper vertical heating chamber or section having a cylindrical wall 4, heads 5, 6 arranged at the upper and lower ends of this wall, and reduced tubular necks 7, 8 arranged centrally on said upper and lower heads and communicating with the interior of the heating chamber. The upper neck 7 is connected by a comparatively short tubular fitting or nipple 9 with the exhaust or outlet openings of both of the engine cylinders so that the hot spent gases or products of combustion of both cylinders are discharged downwardly through the heating chamber. These hot gases escape through the lower tubular neck 8 into one end of a horizontal lower section 10 of the exhaust conduit from the opposite end of which the waste gases may be conducted to the atmosphere or disposed of in any other suitable manner.

In order to reduce the temperature of the exhaust gases before reaching the atmosphere the same may be cooled by means of a water jacket 11 surrounding the horizontal section of the exhaust conduit, the water for this purpose being preferably admitted through an opening 12 at one end thereof and discharged therefrom through an opening 13 in its opposite end or in any suitable and well known manner.

Before the fuel is delivered to the power cylinders of the engine the same is heated by conducting the same through conduits which are exposed on their outer sides to the hot exhaust gases passing outwardly through the exhaust conduit. The means whereby this is accomplished comprise a plurality of upright heating tubes, flues or pipes 14, preferably constructed of copper, and arranged in an annular row lengthwise within the heating chamber and having their opposite ends secured in the upper and lower heads of the heating chamber so that the interior of these tubes open into the space outside of the exhaust conduit.

Surrounding the upper reduced neck of the exhaust conduit is an upper or delivery manifold or chamber 15 into which the upper ends of the fuel heating tubes open between the upper neck and the wall of the heating chamber. On its opposite sides this upper manifold is connected by means of branch or delivery pipes 16 with the inlet of the respective power cylinders.

Surrounding the lower reduced neck of the heating chamber is a lower manifold or receiving chamber 17 into which the interior of the heating tubes open at their lower ends between the lower neck and the wall of the heating chamber. The vaporized and mixed fuel enters the lower manifold through an opening 18 in its side and passes thence upwardly through the several heating tubes into the upper manifold and thence through the branch pipes 16 to the respective cylinders of the engine. While the vaporized fuel is thus passing upwardly through the heating tubes the same is exposed to the heating effect of the exhaust gases which come in contact with the outer sides of the heating tubes, whereby the vaporized fuel is raised in temperature and maintained in a finely divided and mixed condition best suited for obtaining the greatest efficiency of the same upon igniting this fuel in the cylinders into which it is delivered immediately after escaping from the heating tubes.

For the purpose of conserving the heat of the exhaust gases while the same is passing through the heating chamber and causing the same to operate most effectively for maintaining the vaporized condition of the fuel as it passes through the heating tubes the outer side of the wall of the heating chamber is provided with a heat insulating jacket 19 preferably of asbestos, although any other suitable material which answers this purpose may be employed.

For the purpose of permitting the engine to be started by means of the liquid fuel which volatilizes at a comparatively low temperature and is usually high priced and then continue the running of the engine during the major part of its operation with a liquid fuel which volatilizes only at a high temperature and is comparatively low in price, two carbureters 20, 21 are employed to one of which, say 20, gasolene or similar high priced and highly volatile liquid fuel may be supplied while the other 21 may be supplied with kerosene oil or similar liquid fuel which is low priced and lowly volatile. Each of these carbureters may be of any suitable or well known construction and so designed that the liquid fuel supplied to the same will be vaporized and mixed with air in suitable quantities to render the mixture explosive for use in driving the engine. The air for the carbureters shown in the drawings may be supplied through the nozzles 22 on the top thereof, which air, if desired, may be either drawn directly from the atmosphere or first heated more or less so as to promote commingling of the same with the combustible vapor, this heating being preferably accomplished by withdrawing the air from the vicinity of the exhaust conduit or pipe in the usual and well known manner. The vapor from either one or the other of these carbureters or partly from both may be conducted to the inlet opening 18 of the lower manifold 17 by means of a multiple conduit having two inlet branches 23, 24 which are connected respectively with the outlets of the gasolene and kerosene carbureters and a delivery branch 25 which is connected with the inlet opening of the lower manifold 17, and a valve 26, preferably of the rotatable type, arranged at the point of intercession between the inlet and outlet branches 23, 24, 25 and so constructed that when turned into one extreme position the gasolene carbureter will be connected with the delivery branch 25 and the kerosene carbureter cut off, in the other extreme position this valve cuts off the gasolene carbureter and connects the kerosene carbureter with the delivery pipe, while in an intermediate position this valve connects both carbureters partly with the delivery branch. As shown in Fig. 2 of the drawings, this valve is turned so as to connect only the gasolene carbureter with the delivery branch, while in Fig. 1 this valve is turned to connect the kerosene carbureter with the delivery branch. For convenience in turning this valve either into one or the other extreme position the same is provided outside of its casing with an operating arm 27 which is adapted to engage with one or the other of two stops 28, 29 arranged on the casing and operating to arrest the valve in the proper position for connecting either one or the other of these carbureters with the engine cylinders.

Gasolene owing to its highly volatile character may be supplied directly from any suitable source to the inlet of its carbureter inasmuch as the same when vaporized and mixed with air in this carbureter and then delivered to the cylinder of the engine is in condition for ignition and developing power. Kerosene, however, owing to the high temperature required to volatilize the same and mix it with air suitable for producing an explosive mixture is supplied to its carbureter by connecting the latter indirectly with its source of supply and heating the same preliminary to admitting it to its carbureter. The preferred means for this purpose comprises a kerosene supply pipe 30 which connects the inlet of the kerosene carbureter with the kerosene supply and is provided with a heating coil or loop 31 arranged within the horizontal outlet section of the exhaust conduit, as shown in Fig. 1. As the kerosene passes from its source of supply through this heating coil its temperature is raised so as to promote its vaporization and admixture with air in the kerosene carbureter and thereafter this vaporized kerosene is maintained in this vaporous condition together with the air with which it is mixed by passing through the heating tubes of the heating chamber which keeps this mixture of vaporized kerosene and air in a suitable condition to be properly ignited as it enters the engine cylinders and develop the working power of this fuel therein.

In operating an engine equipped with our invention the fuel is supplied to the same upon starting the engine through the gasolene carbureter and after the exhaust gases passing through the exhaust conduit have heated the same and the heating tubes and heating coil therein to the proper degree the gasolene carbureter is cut off and the kerosene carbureter is cut in, so that heated kerosene is drawn from the heating coil into the carbureter and the mixture of air and vaporized kerosene continues to be heated upon passing through the heating tubes and remains in a highly explosive condition up to the time that the same enters the engine cylinders and is ignited therein. By thus heating the kerosene by means of the exhaust gases before entering the carbureter and continuing the heating of the same by the exhaust gases during the passage of the kerosene and air mixture from the kerosene carbureter to the engine cylinders condensation of the kerosene is prevented and the maximum efficiency of the same for power purposes is obtained. This shifting of the fuel from gasolene to kerosene is effected without interrupting the operation of the engine. Inasmuch as kerosene oil when used in this manner develops practically as much power as gasolene, it will be evident that the use of my improvement permits of developing power at much lower cost than has heretofore been possible by the use of gasolene. Furthermore, the use of kerosene as the main motive agent permits of using explosive engines in many places where gasolene operated engines would be prohibitive on account of its dangerous character, thereby extending the field in which explosion engines may be advantageously employed.

We claim as our invention:

A heating device for an explosion engine comprising a conduit provided with an enlarged heating chamber having a wall and heads at the opposite ends of said wall and reduced tubular necks arranged on the central parts of said heads, one of said necks being adapted to be connected with the exhaust pipe of the engine while the other neck is adapted to communicate with the atmosphere, a plurality of heating tubes arranged within said heating chamber and connected with the heads thereof between its necks and wall so that the interior of said tubes open into the space outside of the heating chamber, a delivery manifold chamber which surrounds one of said necks and is adapted to connect with the fuel inlet of the engine and into which one end of the plurality of heating tubes open, and a receiving manifold chamber which surrounds the other neck and is adapted to connect with a fuel supply and into which the other ends of said tubes open.

Witness our hands this 10th day of October, 1913.

WILLIAM E. BLAIR
FRANK J. BLAIR.

Witnesses:
L. A. FISCHER,
A. J. CROFTS.